United States Patent [19]

Demeter et al.

[11] 4,240,911

[45] Dec. 23, 1980

[54] TOWER FILTERS WITH REVERSED WATER-JET FILTER REGENERATION

[75] Inventors: László Demeter; Akos Demeter, both of Budapest, Hungary

[73] Assignee: Nikex Nehézipari Külkereskedelmi Vállalat, Budapest, Hungary

[21] Appl. No.: 16,309

[22] Filed: Feb. 28, 1979

[51] Int. Cl.³ .................. B01D 23/16; B01D 23/24
[52] U.S. Cl. .................. 210/794; 210/189; 210/275; 210/283; 210/798
[58] Field of Search .................. 210/80, 82, 189, 197, 210/268, 275, 277, 279, 283, 285, 286

[56] References Cited

U.S. PATENT DOCUMENTS

| 3,598,235 | 8/1971 | Demeter | 210/80 |
| 3,972,816 | 8/1976 | Mail et al. | 210/80 X |
| 4,126,546 | 11/1978 | Hjelmner et al. | 210/80 X |

Primary Examiner—William A. Cuchlinski, Jr.

[57] ABSTRACT

There is disclosed a method of filtering liquids in a vertical tower filter tank with a flat bottom and liquid inlet and outlet means for flowing liquid under pressure into a sand filter column in the tower tank causing the liquid to flow through distribution gaps which direct the flow horizontally through the filter into a collection pipe and upward out the outlet. In addition the filter is regenerated by backflowing washwater under pressure so the filter grains are slurried and the impurities are removed therefrom and washed out an overflow outlet. The apparatus for conducting the filtering and regeneration are also disclosed. The apparatus has a flat bottom and at least one perforated wall to divide the filter column into sections. There is an inlet for the washwater having a speed accelerating throat.

6 Claims, 4 Drawing Figures

TOWER FILTERS WITH REVERSED WATER-JET FILTER REGENERATION

BACKGROUND OF THE INVENTION

The invention relates to a process and equipment for filtering liquids, especially water flowing horizontally through a sand filter grain column placed in a tower filter, where the regeneration and cleaning of the contaminated filter parts is carried out exclusively with the injection of liquid jets.

Filtering of liquids has become a frequent practice during the recent decades in various fields of industry, and this process has gained vital importance due to the increasing water shortage consequent upon the rapidly increasing water consumption. As a result, tower filters stepped into the foreground, representing great progress in the filtering of liquids, carrying out the filtering with the liquid flowing horizontally through the vertical filter tower, and which—in contrast with the earlier horizontal filtering methods and equipment—have realized the more economical cleaning of the untreated waters, as well as a reduction of investment and operating costs and an improvement of space utilization.

Such process and equipment are described in Hungarian Pat. No. 154,412. Also the invention described in the Hungarian Pat. No. 163,094, represents mainly the improvement achieved in the quality of filtering compared to that achieved by the earlier tower filters.

The experiences acquired in the course of filter tower operations brought up certain difficulties and disadvantages, on the basis of which it became possible to determine the direction of further development. The difficulties turned up first of all in connection with the applied method according to which regeneration of the contaminated filter column was carried out in all types of towers by recirculation or backwashing after a long- or short term operation in such a way, that the contaminated filter grains were carried from the cone-shaped collecting space at the bottom of the filter tower into the collecting space on the top of the filter through pipes provided for this purpose, placed outside or inside the filter tower by compressed air flow, injector, mammoth-pump. Then after washing and settling the filter grains were carried or washed back into the upper part of the filter column. These known methods of regeneration are unfavourable in several respects, such as:

- dead spaces remain in the process of backwashing, deteriorating the quality of filtering due to slump of the sand,
- the pipe system and machinery for the recirculation incur additional costs in regard to investment and maintenance,
- owing to clogging of the narrow cross sections of the slurry pipes, the presently used methods of recirculation results in considerable loss of operating time and loss of capacity,
- recovery of the filter grains from the cone-shaped collecting tank during regeneration restricts the conical formation of the tower filter, for it requires significant inactive height,
- the conical bottom is especially unfavourable in the high-capacity filter units since it further reduces the proportion of useful volume. Additionally, the cost of tooling and for statical reasons the specific material utilization also increases.

Cleaning the periodically clogged up sieve surfaces that form the walls of the filtered water collecting space similarly causes great difficulty in the known tower filters, because the large surface reduces the speed, consequently the cleaning with back flushing can not be carried out effectively and in acceptable quality.

Finally it is difficult to remove the sand from the untreated water-distributing space developed differently in the various types of tower filters, into which the contaminated sand passes mainly during regeneration of the filter grain column.

The invention is aimed at eliminating the existing disadvantages occurring in regeneration of the tower filters, and attaining a more effective, better, cheaper and more productive solution for the regeneration and cleaning of the contaminated filter grain column and other filter parts.

A further object is to increase the economic efficiency through a reduced space requirement and use of fewer raw materials.

The invention is based on the recognition that the above goal is attainable, thus the disadvantages connected with costliness of the equipment, quality of the filtering and time of the regeneration arising mainly due to regeneration of the tower filters can be completely eliminated, provided that regeneration is carried out exclusively with injection of water jets of proper position, direction and speed.

Thus the invention is a process for filtering liquids flowing horizontally through the filter column, characterized in that the regeneration of the contaminated filter column is carried out without any extra equipment /mammoth-pump, compressor, or water jet pump/ only by injection of water jets in such a way, that the filter column is slurried at the bottom, bringing about reversed flow with pressure of the water jets, thus bringing about recirculation and backwashing, whereby the filter grains are cleaned. Since slurrying the bottom of the filter column can be extended to a smaller or larger area by varying the intensity of the injected water jets, hence the ratio between the recirculation and backwashing can be varied at will in the sand column. Backwashing of the filtered water collecting pipe and removal of the sand from the untreated water-distributing gap with water jet represent essential parts of the invention, the latter operations being applicable independently too in the earlier sand filters, or these filters can be converted subsequently as well.

The invention relates also to an equipment to carry out the process, in which according to the direction of the flow a narrow gap is brought about before the filter grain column with wall of nonoverlapping panels, communicating through a large gap underneath with the filter grain column. This gap serves for distribution of the water to be filtered and for the path of the filter grain recirculation during regeneration of the filter column. Furthermore a lower space is developed with deflecting plate in the equipment under the untreated water distributing gap, in order that after cleaning of the filter grain column, one or several water jets are injected for removal of the sand from the distributing gap, when by breaking up on impact and scattering the jets come into a swirling motion, then flowing upwards carry the filter grains getting here during the recirculation onto the top of the filter column, thereby freeing the untreated water distributing gap. Finally following the flow of liquid, a vertical collecting pipe—not letting through the sand grains, but letting through the filtered water—is placed into the equipment to the wall of the filter tank behind the filter column, for discharging the filtered water from the tank. The upper end of the collecting pipe is provided with a speed accelerating throat connected with the filtered water-return pipe.

The experiences acquired with the known tower filters have shown that even the many times oversized clean water-discharging surfaces can not prevent clogging of the sieve surface sooner or later. Such clogging may be caused for instance by the tiny grains always existing in the filter sand, wedged up in the sieve holes; the colloidal impurities passing through the sand layer get deposited on the sieve surfaces during temporary failure in the chemicals' supply; scale precipitating on the sieve, due to pressure drop in case of filtering deep waters. Such clogged up large surfaces can not be effectively cleaned with back flushing, because of the low velocity.

The solution to these problems according to the invention starts out from conceptual considerations contrary to the established practice. Namely from the idea that it uses such small surface only for collection of the filtered water, which just lets through the appropriate quantity of filtered water. Such relatively small surface can be back flushed effectively, because the backflushing water flows with sufficient velocity from the sieve surface to wash out the wedged up sand grains and adhering impurities. However, for this purpose it was necessary to ensure that the backwashing water should flow with adequate velocity both on the lower and upper end of the sieve surface. The experiments demonstrate that it is practicable to use a single vertical collecting pipe for collection of the filtered water, into which the flushing water is conducted from the top downwards through the speed accelerating throat at the rate of 5–15 m/sec.

The experiments prove, that in such case the flushing water does not escape through the upper part of the sieve pipe, because the injected water jet penetrates to the bottom of the sieve pipe, there impacting and congesting ensures a practically uniform flow-out on the whole surface.

In accordance with above, the regeneration is started at the end of each filtering period, by letting filtered water into the collecting pipe of the clean water from the top downwards at the already mentioned rate of 5–15 m/sec for a few seconds. Since according to above, only a single collecting pipe is used, the flushing water flows at a high speed on its relatively small surface into the filter column, and thus it cleans not only the jacket of the collecting pipe, but it washes out completely the thin sand layer in its full length between the collecting pipe and filter tank. This way formation of the slumping sand layer behind the collecting pipe becomes impossible.

This is followed with regeneration of the filter column. This is carried out by underwashing the filter grain column with water jets, and the slurry flowing in the opposite direction—making it to flow upwards in the untreated water distributing gap, that is connected with the sand column at the bottom—is carried to the top of the filter grain column, settled, and meanwhile the waste water is discharged through the overflow.

By the time the filter grain column is cleaned, the recirculating and backwashing water jets are turned off and conducted into the lower part of the untreated water-distributing gap in such a way, that the suitably distributed sand-removing water jets slurry the sand only in the untreated water distributing gap and wash it up onto the top of the sand column, without underwashing the filter column.

Velocity of the liquid to be filtered—conducted horizontally through the sand column in the filtering process of the invention—and the sand grain size are selected in such a way, that penetration of the filtered contaminating particles should extend only to about half of the filter column, while the other half of the column should serve as a protective layer to ensure the cleanliness of the filtered water.

Thus in one of the suggested constructional embodiments of the equipment according to the invention, the filter column is divided vertically with a perforated plate containing large holes, and this way the sand layer in the front and rear on both sides of the perforated plate can be regenerated separately from each other—the layer in the rear with less frequency—by slurrying, recirculation and backwashing, because the sand grains do not mix with each other in the practice, even if the holes are much bigger than the sand grains.

Since practically only the front layer of the filter column divided by the perforated plate gets clogged up during filtering, only this has to be recirculated during each regeneration, while the rear layer—which hardly gets contaminated—should be cleaned only occasionally. Thus by dividing the filter column into two layers with the perforated plate, the time of regeneration can be reduced to half in practice.

In another preferable construction alternative of the invention, two sand columns are placed in the filter tank symmetrically with the untreated water-distributing gap of common diametral plane, when the two filter columns are provided with separate collecting pipes.

The invention is described in detail with reference to the accompanying drawings, in which FIG. 1 shows the structure and function of a flat bottomed tower filter in vertical section according to the invention;

Figure 2:
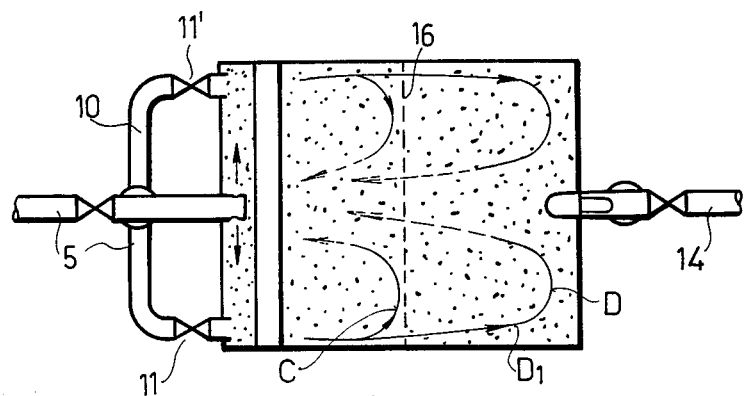
FIG. 2 is the tower filter shown in FIG. 1 in horizontal section.
Figure 1:
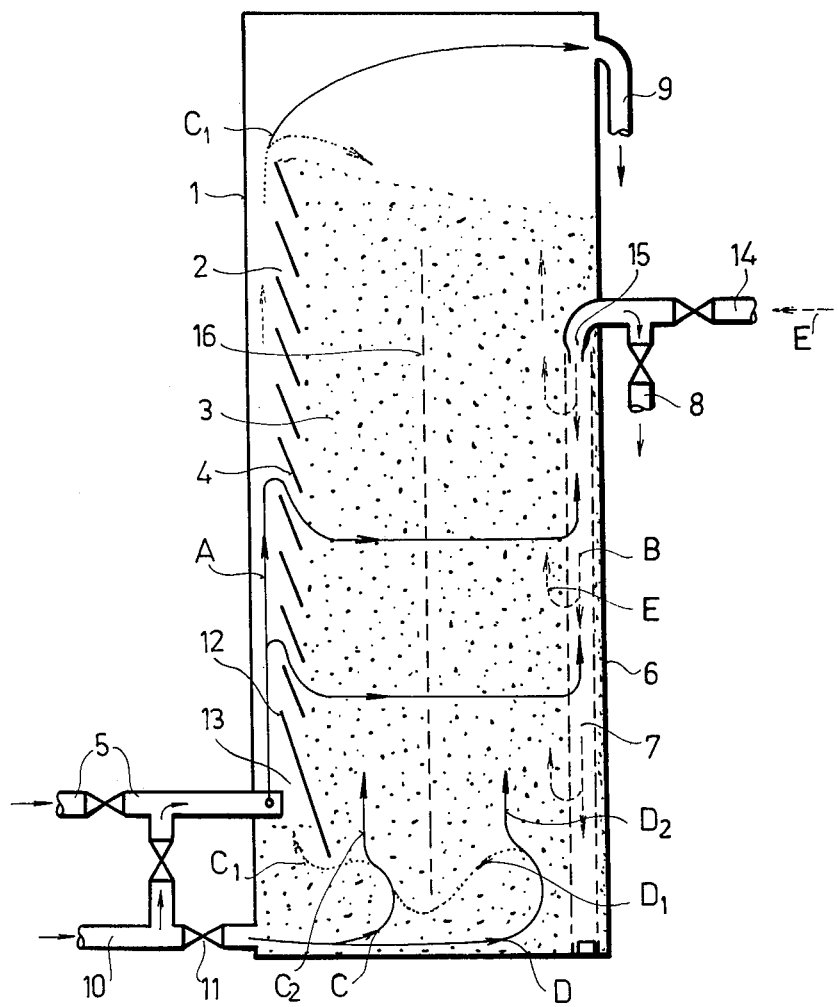

In an exemplary version of the tower filter column of the invention shown in FIGS. 1 and 2, an untreated or filterable water distributing gap 2 is provided behind the front wall 1 of the tank, surrounded by a louvered panel wall 4 on the side facing a said column 3. The water to be filtered is conducted into the distributing gap 2 through the inlet pipe 5 from which the water can flow upwards. The sand column opposite the front wall 1 is surrounded by the rear wall 6 of the tank, in the vicinity of which the collecting pipe 7 for the filtered water is placed in the middle, connected with the outlet pipe 8 for the filtered water. Connection of the overflow pipe 9 is on the upper part of the filter, as shown. An inlet pipe 10 is provided for regeneration of the filter when clogged up, having two cocks or valves 11, 11' through which the slurrying water jet is injected. For sand removal from the untreated water distributing gap 2 following recirculation of the filter column, the untreated water-distributing lower space 13 with a deflecting plate 12 is developed. For backwashing the filtered water-collecting pipe 7, the return pipe 14 is connected to the outlet pipe 8, the front part of which pipe 14 is formed as a speed increasing throat 15.

At 90° to the direction of water flow in the tower filter the perforated dividing wall 16 is situated in the centre plane of column 3, or in its vicinity, with the aid of which the cleaning process can be restricted to the front part of the filter column.

The tracks or paths of the water to be filtered and those of the cleaning jets are shown in FIGS. 1, 2. Track "A" indicates the path of the water to be filtered, and "B" the path of the filtered water. The water jets recirculating the front part of filter column 3 pass along track "C", while those recirculating the rear part of column 3 pass along track "D", or in their vicinity, respectively. Arrows "E" show the path of the water jet injected from the top downwards, used for backwashing the collecting pipe 7.

The tower filter shown in FIGS. 1 and 2 is cleaned in the following way:

When the filter column 3 gets clogged up and its regeneration becomes necessary, entry of the water to be filtered in the inlet pipe 5 and its exit through outlet pipe 8 are stopped, and the regeneration is started by conducting the filtered water from above at the rate of 5–15 m/sec into the filtered water-collecting pipe 7 and through the return pipe 14, which rapidly accelerates due to the effect of throat 15. The filtered water is injected for a few seconds, while the flushing water flows at high speed into the sections of sand column 3 in the vicinity of collecting pipe 7, and thereby not only the sieve surface of the collecting pipe gets cleaned, but any thin sand layer between the collecting pipe 7 and the rear wall 6 will also be completely washed out.

If cleaning of only the more contaminated front layer becomes necessary in sand column 3, then the bottom of the column is underwashed with water jets injected through the lower space 13 of the distributing gap 2 via the inlet pipe 10 in such a way that the water jet path fits track C. By proper adjustment of the rate of injected water, only that part of the column participates in the recirculation, which is in front of the perforated wall 16, following one part of the reversed water jets passing along a track $C_1$ through distributing gap 2. At the same time the slurrying other part of the water jets, flowing back as a result of the impact pressure, flows along track $C_2$, and washes back the filter grains passing downwards.

From time to time, when regeneration of the part of the filter column behind the perforated wall 16 becomes necessary, then the part of the filter column 3 behind wall 16 is regenerated in such a way that, by turning off valve 11, the flow velocity of the injected water jet is increased to double its rate through the open cock 11, thus the slurrying water jets are forced to tracks D, $D_1$, $D_2$, whereby recirculation and backwashing of the right hand half of the rear grain column takes place. On the other hand the left hand half of the rear grain column is regenerated by opening valve 11', and turning off valve 11. The slurrying water is discharged through overflow 9 in both cases, carrying along the impurities washed out from the filter grains.

Finally, after cleaning the filter column as described above, the recirculation is stopped and the water jet is injected into the lower space 13 of the distributing gap 2, with which the sand is washed up and removed from the distributing gap by suitable distribution of the jet. This way a new filtering cycle may begin.

Figure 4:
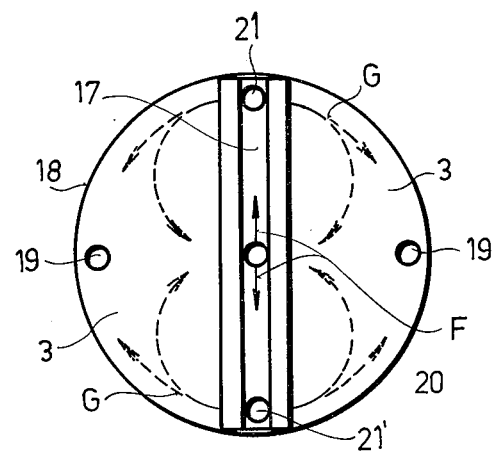
FIG. 4 is a vertical section of the tower filter of FIG. 3.
Figure 3:
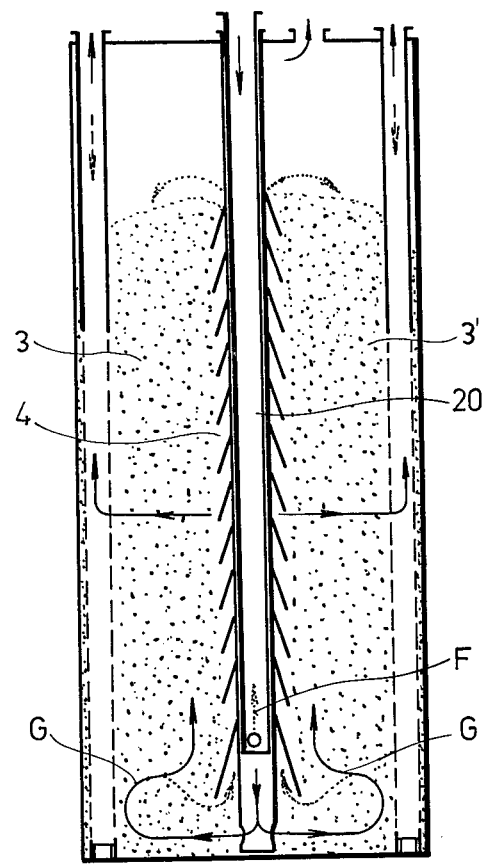
FIG. 3 shows in a vertical section a round tower filter two filter grain columns placed on the sides of a common distributing gap; at the end of the line

The tower filter presented in FIGS. 3 and 4, is a suggested alternative construction, the tank of which is cylindrical, and an untreated water distributing gap 17 (2 in FIGS. 1,2) is situated along a diametral plane of a cylindrical mantle 18. In this embodiment two filter columns 3 and 3' and two filtered water-collecting pipes 19 (7 in FIGS. 1,2) are positioned symmetrically to the distributing gap 17. "F" in the drawing indicates the path of the water conducted into the distributing gap 17, while "G" shows the path of the water flowing out of the two inlet pipes 21 and 21' used for injecting the cleaning water during regeneration of the filter column.

Operation and regeneration of the tower filter according to the version shown in FIGS. 3 and 4 take place as follows: The liquid flowing through an inlet pipe 20 is uniformly distributed horizontally and vertically in the direction of "arrows F" in the untreated water distributing gap 17, and flowing through the gaps between the louvered panels 4 gets cleaned in filter columns 3 and 3', then it passes out through the filter collecting pipe 19. When filter columns 3 and 3' are clogged, the filtering is stopped, in other words the entry through pipe 20 and the exit through pipes 19 are stopped, and for the purpose of regeneration recirculating water is conducted through pipes 21, 21' into filter columns 3 and 3'. Recirculation and backwashing of the filter grains of column 3 with the liquid flowing on track 8 take place as before. Removal of the sand from the distributing gap 17 and backwashing of collecting pipes 19 can be carried out as described before.

The equipment shown in FIGS. 3 and 4 has a favourable feature in as much as it can also function in a closed construction under pressure, in which case it can be set up under the ground surface as necessary, and this way it can be located outside a building, or a substantial saving can be attained in the height of the building intended for the location of the tower filter.

The process and equipment of the invention can be realized in several other construction forms besides that of the described examples. The filter tank may be for instance polygonal, it may be made of steel, aluminium, concrete, or synthetic material. The filter units may be built into a block, operated in series or parallel connection, depending on the qualitative and quantitative requirements.

Regeneration of the filter may be started with recirculation too, flushing back the filtered water-collecting pipe only afterwards, and what is more, it is sufficient to carry out the backflushing at weekly intervals. Occasionally the filter may be regenerated by omitting the recirculation and carrying out only the backflushing of the collecting pipe and removal of the sand from the distributing gap twice or three times in a succession. In case of several collecting pipes, the backflushing can be carried out in pairs or also individually. By proper selection of the intensity and velocity of the water jets, and by their application at the proper places, effectiveness of cleaning the sand column can be increased by the desired degree.

Application of the process and equipment of the invention yields the following advantages:

The clean water collecting pipe of the filter can be washed back within seconds, thereby the greatest problem of the existing tower filters is eliminated, i.e. the problem caused by clogging of the collecting pipes;

As a result of the high-capacity reversive slurry recirculation and fast sand removal from the distributing gap, regeneration of the filter column takes a very short time, no more than a 10th to 20th part of the earlier cleaning time;

Time of the regeneration is further reduced if the filter column is divided into two separately cleanable layers;

Since there is no need for the usual mammoth pump, compressor or water jet pump either, there is no narrow cross section that might cause clogging;

There is no slumping sand or water space in the filter;

The simple flat-bottomed tank fully utilizes the space and the filter medium;

Its simple, straight louvered panels—fitted without overlapping—do not require tooling and can be manufactured by a simple method;

The flat-bottom construction statically permits the economic making of the unit in optional sizes at a considerable saving of material utilization;

No need for an expensive pipe-cellar because the filter is built on the ground surface or is lowered into the ground;

Its handling is simple and easily automated because it requires only valves to be turned on and off;

It may be operated—depending on qualitative requirements—as a contact filter, with chemical pre-treatment, prepurification, or may be used without these in waste water purification as well.

The invention completely eliminates all the shortcomings of the presently existing tower filters, and in addition the useful volume also increases, which when built into a block reduces space requirements to about a quarter of its present size, reducing the cost of manufacture and investment also by about 50%.

What we claim is:

1. A process for filtering liquids flowing horizontally through a sand filter column in a tower filter tank having a flat collecting space comprising, causing the liquid to be filtered to flow under pressure to a vertical column of a sand filter material through an inlet pipe that guides the liquid flow from the bottom of the column upward to and through vertically situated distributing gaps which guide the liquid in a horizontal direction from the front to the back of the tower through the filter material and a diametrical perforated wall into holes in a vertical collecting pipe through which the liquid flows upward to an outlet pipe on the back wall of the tower, then regenerating the filter material in the vicinity of the collecting pipe and cleaning the inside of the collecting pipe by interrupting the flow of liquid to be filtered and reversing the flow of liquid by causing wash liquid to flow under pressure through an inlet pipe at the rate of about 5-15 m/sec. to the filter material through holes in the vertical collecting pipe in a downward direction, thereby slurrying the sand filter material in the vicinity of the collecting pipe and causing grains thereof to flow upwards whereby the collecting pipe is cleared of deposited impurities and the grains of sand filter material thus slurried are washed free from impurities which are removed in the wash liquid which flows to an overflow outlet at the top of the column; whereby at the same time the remaining sand filter material in the tower is regenerated by causing the wash liquid to flow under pressure through an inlet pipe to the bottom portion of the column and cause the sand filter material to be loosened and slurried and separated from impurities which are carried by the flowing liquid upward to the overflow outlet at the top of the tower.

2. The process of claim 1 wherein the remaining sand filter material is regenerated by causing the wash liquid to flow under pressure through an inlet pipe at the bottom portion of the tower to a deflecting plate which directs the flow to the bottom portion of the column and causes the sand filter material to be loosened and slurried and separated from impurities which are carried by the flowing liquid upward to the overflow outlet at the top of the tower.

3. The process of claim 1 or 2 in which the liquid to be filtered is contaminated water and the wash liquid is water.

4. Apparatus for filtering liquids to remove impurities therefrom comprising, in combination,
   a vertical tower filter tank with a flat bottom and a flat collecting space;
   said tower having therein a column of filter particles separated into at least two sections by a vertical perforated wall with holes larger than the grains of the filter particles;
   distributing gaps in the front section of said column comprised of non-overlapping horizontal louvered panels situated vertically with respect to each other, which gaps direct the liquid flow horizontally;
   inlet means which direct the liquid under pressure to be filtered to the distributing gaps in the column, said inlet means having a means for interrupting the flow of liquid to be filtered;
   at least one vertical collecting pipe with holes for receiving the horizontally flowing liquid;
   outlet means attached to a side of the tower near the top of the column for receiving the filtered liquid from the collecting pipe;
   overflow means at the top portion of the sides of the tower;
   means with a speed accelerating throat attached to the side of the tower near the outlet means for directing wash liquid under pressure into the collecting pipe in a flow direction opposite the flow of the filtered liquid; and
   means for conducting wash water into the bottom of the filter column.

5. The apparatus of claim 4 wherein a deflecting plate essentially parallel to the louvers and below them in the column is situated for deflecting the wash liquid entering to the filter material at the bottom of the tower.

6. The apparatus of claim 4 wherein there is a liquid distributing gap in one of the diametral planes of said filter columns, two of which are symmetrically positioned and are fitted on the two sides with separate filtered water collecting pipes.

* * * * *